United States Patent
Saluja et al.

(10) Patent No.: US 11,805,108 B2
(45) Date of Patent: Oct. 31, 2023

(54) SECURE VOLUME ENCRYPTION SUSPENSION FOR MANAGED CLIENT DEVICE UPDATES

(71) Applicant: VMware, Inc., Palo Alto, CA (US)

(72) Inventors: Neeraj Saluja, Round Rock, TX (US); Akhil Parasa, Cedar Park, TX (US); Kevin Sheehan, Bloomfield, CT (US); Shravan Shantharam, Cumming, GA (US)

(73) Assignee: VMWARE, INC., Palo Alto, CA (US)

( * ) Notice: Subject to any disclaimer, the term of this patent is extended or adjusted under 35 U.S.C. 154(b) by 30 days.

(21) Appl. No.: 17/316,346

(22) Filed: May 10, 2021

(65) Prior Publication Data

US 2022/0360571 A1    Nov. 10, 2022

(51) Int. Cl.
- *H04L 9/40* (2022.01)
- *G06F 8/65* (2018.01)
- *H04L 41/22* (2022.01)
- *H04L 67/1097* (2022.01)

(52) U.S. Cl.
CPC ............ *H04L 63/0471* (2013.01); *G06F 8/65* (2013.01); *H04L 41/22* (2013.01); *H04L 63/0876* (2013.01); *H04L 63/20* (2013.01); *H04L 67/1097* (2013.01)

(58) Field of Classification Search
CPC . H04L 41/22; H04L 67/1097; H04L 63/0471; H04L 63/0867; H04L 63/20; G06F 8/65
See application file for complete search history.

(56) References Cited

U.S. PATENT DOCUMENTS

| | | | | |
|---|---|---|---|---|
| 8,250,379 | B2 * | 8/2012 | Thom | G06F 21/57 713/193 |
| 2016/0191611 | A1 * | 6/2016 | Srinivasan | H04L 41/0893 709/201 |
| 2018/0131574 | A1 * | 5/2018 | Jacobs | H04L 43/0817 |
| 2020/0274776 | A1 * | 8/2020 | Nishikawa | H04L 41/082 |

OTHER PUBLICATIONS

Information Protection—BitLocker. docs.microsoft.com. pp. 1-8, 14-19, 35-105, 115-136, 143-147, 152-185, 191-206, and 230-321. Dates range from Mar. 5-May 7. (Year: 2021).*
Manage additional Windows update settings, docs.microsoft.com. pp. 1-11. (Year: 2019).*
Li, Li-xia. English translation of CN 110795121 A. pp. 1-11. (Year: 2019).*
Leonhard, Woody. "The difference between Defer updates, Pause updates and Delay updates". https://www.computerworld.com/article/3447877/the-difference-between-defer-updates-pause-updates-and-delay-updates-and-what-happens-with-win10-19.html (Year: 2019).*

* cited by examiner

*Primary Examiner* — John M Macilwinen
(74) *Attorney, Agent, or Firm* — Thomas Horstemeyer, LLP

(57) ABSTRACT

Examples of scheduled and on-demand volume encryption suspension are described. In some examples, volume encryption is to be suspended for a client device. A suspension limit is identified for a volume encryption suspension for the client device. A suspend encryption command is generated to include instructions for the client device to apply the volume encryption suspension according to the suspension limit. The suspend encryption command is transmitted to the client device for execution.

20 Claims, 5 Drawing Sheets

FIG. 4

Management Console of UEM Service 120

Restricted Action – Suspend Volume Encryption

You are about to perform the Suspend Volume Encryption Action. Please review the following information and enter a note in order to proceed.

403 → Number of Reboots [2 ▽] ←406    Schedule Time and Window ⊞ ←409

| | |
|---|---|
| Device Name | Admin Desktop 10.0.17763ab6 |
| Category | Corporate – Dedicated |
| Platform | WinRT |
| First Name | Admin |
| Last Name | User |
| OS Version | 10.0.17763 |
| Email | admin.user@corporate.com |
| Display Model | Desktop |
| Organization Group | Administrators |
| Update Type | BIOS Update – ClientBIOSv1.23 ←412 |
| Note Description* | [                    ]    [Apply] ←415 |

SECURE VOLUME ENCRYPTION SUSPENSION FOR MANAGED CLIENT DEVICE UPDATES

BACKGROUND

Mobile devices are being used for access to enterprise computing systems and resources with greater frequency. With the growing number of different mobile devices, platforms, and operating systems available for adoption by users, various challenges can arise in the management of the mobile devices. Access to the capabilities of a mobile device can be managed through the administration of the suite of applications based on a set of management policies, compliance rules, and configuration data which is defined and enforced by the management service.

The proliferation of tablet and smartphone devices, for example, has resulted in several companies and organizations allowing employees to bring their own devices to work. The use of these personal devices can be associated with productivity gains and cost savings. The concept "bring your own device" (BYOD) for access to enterprise computing systems may have met initial resistance due to security concerns, but more and more companies are now looking to incorporate BYOD policies.

Volume encryption can be part of the enterprise information security strategy for organizations. Enterprises can enforce operating-system-based encryption technologies to enforce operating system and disk volume encryption to ensure their assets and intellectual property remain secure. However, device updates such as hardware, software, and firmware updates can fail or cause system failure when volume encryption is enforced. Accordingly, a better solution is needed to enable device updates for devices that include volume encryption.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 4 illustrates an example user interface for secure volume encryption suspension for managed client device updates, according to various examples described herein.

DETAILED DESCRIPTION

The present disclosure relates to secure volume encryption suspension for managed client device updates. As noted above, volume encryption can be part of an enterprise information security strategy for organizations. Enterprises can enforce operating-system-based and other encryption technologies to enforce fixed disk volume encryption to ensure their assets and intellectual property remain secure. Device updates such as hardware, software, and firmware updates can fail or cause system failure when volume encryption is enforced. However, the present disclosure describes mechanisms that can enable secure scheduled and on-demand volume encryption suspensions, for example, to update client devices that are managed by a management service such as a unified endpoint management (UEM) service.

Figure 1:
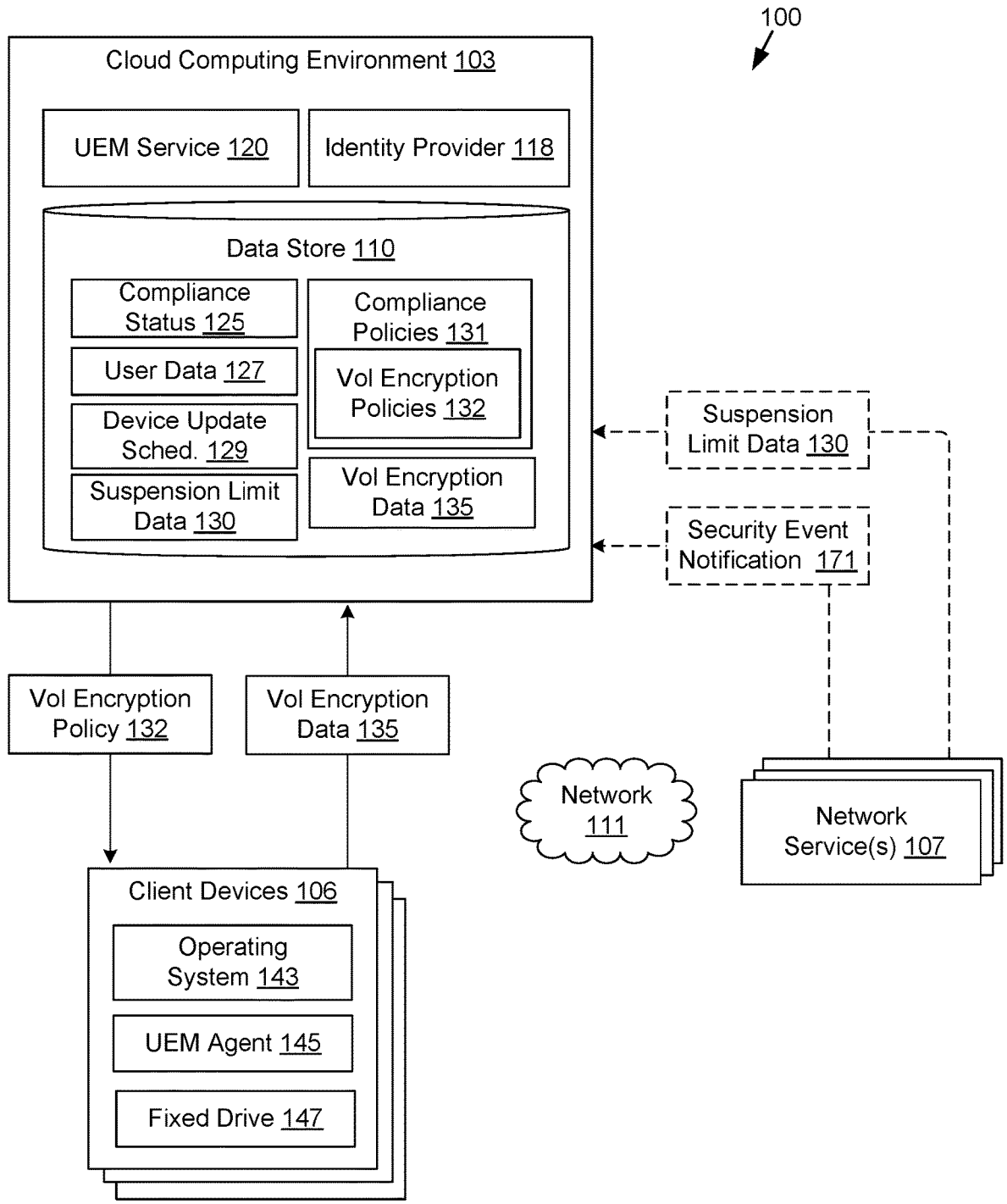
FIG. 1 illustrates an example networked environment that includes components that provide secure volume encryption suspension for managed client device updates, according to various examples described herein.

FIG. 1 illustrates an example networked environment 100 that includes components that provide secure recovery key management for removable volume encryption enforcement according to various examples described herein. The networked environment 100 includes a cloud computing environment 103, several client devices 106, and an network service 107 in communication through a network 111.

The cloud computing environment 103 can be embodied as one or more computers, computing devices, or computing systems. In certain embodiments, the cloud computing environment 103 can include one or more computing devices arranged, for example, in one or more server or computer banks. The computing device or devices can be located at a single installation site or distributed among different geographical locations. The cloud computing environment 103 can include a plurality of computing devices that together embody a hosted computing resource, a grid computing resource, or other distributed computing arrangement. In some cases, the cloud computing environment 103 can be embodied as an elastic computing resource where an allotted capacity of processing, network, storage, or other computing-related resources varies over time. As further described below, the cloud computing environment 103 can also be embodied, in part, as certain functional or logical (e.g., computer-readable instruction) elements or modules as described herein.

The cloud computing environment 103 can operate as an environment for mobile device management and a unified endpoint management (UEM) platform that can manage the client devices 106, fixed drives 147, and other devices and endpoints. In that context, the cloud computing environment 103 includes a data store 110. The cloud computing environment 103 can also execute a UEM service 120 and an identity provider 118. The data store 110 includes areas in memory for the storage of a compliance status 125, user data 127, device update schedules 129, suspension limit data 130, compliance policies 131, and volume encryption policies 132, among other types of data. The UEM service 120 can operate as a UEM platform that can manage client devices 106 that are enrolled as managed devices with the UEM service 120.

The device update schedule 129 can include update schedule data that is applicable to one or more of the client devices 106. The device update schedule 129 can specify a time, date, and time window for a particular update to be applied to a client device 106 or group of client devices 106. In other cases, the specified time, date, and time window can be specified for a particular type of update. A hardware update can be scheduled during business hours when technical support or information technology professionals are working, while a software, firmware, operating system, or encryption update can be scheduled to be performed by the UEM agent 145 at a time that is not during business hours. The device update schedule 129 can be entered by an administrator through a console user interface of the UEM service 120. The update schedule can specify times, dates, and time windows for specific updates that are known to be available, and can also specify times, dates, and time windows for general updates or a specified type of update if that type of update is available. The device update schedule 129 can also include update availability data retrieved from a network service 107 that provides an indication of whether an operating system, software, or firmware update is available. If an update is available, then it can be automatically scheduled during the corresponding time. Times, dates, and time windows can refer to single times or periodic times such as weekly, monthly, bi-weekly, bi-monthly, and so on.

The suspension limit data 130 can include encryption suspension limits for particular updates and particular types of updates. The UEM service 120 can identify that an update is scheduled and can identify an appropriate encryption suspension limit for the update according to the suspension limit data 130. The suspension limit data 130 can specify a number of reboots, a time period, and other information that provides a limit to volume encryption suspension. In some cases, the operating system 143 or other volume encryption service can take a number of reboots as a parameter in order to suspend encryption for the number of reboots, where a particular parameter such as zero suspends encryption indefinitely. If the suspension limit includes a number of reboots, the UEM service 120 can generate a suspend encryption command that includes the number of reboots. If the suspension limit includes a time window, the UEM service 120 can generate a suspend encryption command that specifies the time window as well. If only a time window is specified, then a suspend encryption command can include the indefinite suspension parameter or an arbitrary large number of reboots, and a command for the UEM agent 145 to restore encryption after the time window has elapsed.

The operating system 143 can include Windows® 10, which can utilize BitLocker® for volume encryption. The UEM agent 145 can transmit removable volume encryption data 135 in response to various events, periodically, and according to a schedule. The operating system 143 can also include Linux®, MacOS®, and another operating systems that utilize other volume encryption services. The client device 106 can also use other volume encryption services such as VeraCrypt® and TrueCrypt®. The compliance status 125 can identify which rules or policies a client device 106 or a user account linked to the client device 106 has violated. For example, the client device 106 may have been taken outside of a specified geofence defined for the client device 106. As another example, the client device 106 may have an unencrypted fixed drive 147.

User data 127 represents information about users who have user accounts in the enterprise. These users can also have one or more client devices 106 that are enrolled as managed devices with the UEM service 120. User data 127 can include authentication data, and information about third party services with which the user is assigned an account.

The fixed drive 147 can include a fixed or client-device-specific memory connected through a bus of the client device 106. The fixed drive 147 can be client-device-specific and can be connected to an internal bus connection point of the client device 106 such that the fixed drive 147 is integrated with the client device 106. The fixed drive 147 can correspond to a drive type or classification of drives that is recognized by the operating system 143 as a fixed drive 147 rather than as a removable drive. For example, the fixed drives 147 can include disk drives, solid state drives, flash drives, and other drives in a fixed drive format and arrangement.

The operating system 143 or another volume encryption service can obtain a volume encryption password, encrypt the fixed drive 147, and generate a drive recovery key that is uniquely associated with the fixed drive 147. However, the drive recovery key is not necessarily static, so a fixed drive 147 that is re-encrypted is not limited to the same drive recovery key for each encryption event. A drive recovery key can include a unique numerical, alphanumerical, or any character-based password that can be used to unlock access to the fixed drive 147 if the operating system 143 or its encryption instructions are unable to confirm that access is authorized. In one example, the drive recovery key can include a unique 48-digit numerical key. This drive recovery key can be saved as a file or printed when the standard encryption process of the operating system 143 is used. A recovery key identifier can be used in order to identify a drive recovery key. The recovery key identifier can include a unique numerical, alphanumerical, or any character-based password that can be mapped to the drive recovery key. For example, an 8 digit numerical key or a 32 digit alphanumerical key. The recovery key identifier can include or be generated using a hardware address of the fixed drive 147. The operating system 143 or other volume encryption service can also support volume encryption suspension.

The volume encryption policy 132 can specify volume encryption parameters including a recovery type, volume encryption method or algorithm, cipher strength or number of characters, and other parameters. The recovery type can include a recovery key identifier recovery type and can specify that the recovery key identifier be written to an encrypted data location such as the UEM agent encrypted storage area. The UEM agent 145 can have access to the UEM agent encrypted storage area. The UEM agent 145 can also operate in a privileged mode under the system account so that users do not have access to the contents of the UEM agent encrypted storage area.

The volume encryption parameters can also specify that the drive recovery key be written to the UEM agent encrypted storage area. The UEM agent 145 can transmit a volume encryption command 149 that causes the operating system 143, or other instructions, or applications executed on the client device 106 to encrypt the fixed drive 147 according to the volume encryption policy 132. The volume encryption password can be entered or generated to conform to specified volume encryption parameters for the fixed drive 147.

The UEM service 120 can enroll several client devices 106 for mobile device management services. To begin enrollment, the UEM service 120 can identify and authenticate one of the client devices 106 and store data related to the client device 106 for later reference. In some cases, the UEM service 120 (or a UEM agent 145, an application, or a component executing on the client device 106) can also be registered as a device administrator (at least in part) of the client device 106, permitting the UEM service 120 to configure and manage certain operating aspects of the client device 106.

Once the client device 106 is enrolled for device management by the UEM service 120, the UEM service 120 can direct the installation of various software components or applications on the client device 106. The software components can be configured on the client device 106 at the direction of the UEM service 120. Such software components can include, for example, applications, resources, libraries, and other related components.

The UEM service 120 can transmit compliance policies 131, compliance rules, and configuration data for execution by and/or enforcement on the client device 106. In that context, during or after enrollment, the UEM service 120 can retrieve or generate a set of management policies, compliance rules, and configuration data for the client device 106 and transfer those policies, rules, and data to the client device 106 for reference by the operating system 143 and certain applications executing on the client device 106.

The UEM service 120 can also provide a management console as an engine and console interface for device management of the client devices 106. An information technology administrator or user, for example, can view, administer, and update the management policies, compliance rules, and configuration data on the client devices 106 using the management console. The policies, rules, and configuration data can be collectively administered for several of the client devices 106 by organizing the client devices 106 into several different groups or categories of devices, according to organizational or other factors or considerations.

The UEM service 120 can ensure compliance of the client device 106 in conjunction with the UEM agent 145 and other instructions executed by the cloud computing environment 103 and the client device 106. For example, the UEM service 120 can transmit the volume encryption policy 132 to the UEM agent 145 for enforcement.

The UEM agent 145 can also determine that a fixed drive 147 is unencrypted by an operating-system-based encryption specified in the volume encryption policy 132. The UEM agent 145 can enforce the volume encryption policy 132 by directing encryption of the fixed drive 147 using an operating-system-based encryption such as BitLocker® full volume encryption, or another volume encryption service.

The identity provider 118 can provide single sign-on or identity management capabilities for an enterprise. The identity provider 118 can allow users to authenticate his or her identity to obtain an authentication token that can be provided to an network service 107. The identity provider 118 can utilize OAuth, security assertion mark-up language (SAML), or other single sign-on methodologies. The identity provider 118 and UEM service 120 can communicate so that the UEM service 120 can revoke or authorize access to various services for users in the enterprise based on status of a client device 106 assigned to the user. The identity provider 118 can also rely on user data 127 in the data store 110. In some examples, the identity provider 118 can rely upon a separate source of user data in a separate data store.

The network services 107 can be embodied as one or more computers, computing devices, or computing systems. Like the cloud computing environment 103, the network service 107 can include one or more computing devices arranged, for example, in one or more server or computer banks. The computing device or devices can be located at a single installation site or distributed among different geographical locations. The network service 107 can include a plurality of computing devices that together embody a hosted computing resource, a grid computing resource, or other distributed computing arrangement. The network service 107 can also be embodied, in part, as certain functional or logical (e.g., computer-readable instruction) elements or modules as described herein.

The network services 107 can include first party and third party services provided by an enterprise to its users. A network service 107 can federate its authentication for users of the enterprise to the identity provider 118. A network service 107 can be a cloud-based storage service, recovery key escrow service, or another system for which the identity provider 118 can authenticate access by users of the enterprise. A network service 107 can be accessible over the Internet or another public WAN. For example, the UEM service 120 can use the identity provider to authenticate with the network service 107 and can invoke an application programming interface (API) or a function of an API to store, modify, and retrieve removable drive recovery keys 137 stored on a data store 110 of the network service 107.

A network service 107 can also include an intelligence service that analyzes data collected from the client devices 106 in order to identify security risks associated with the client devices 106. For example, the network service 107 can identify an anomaly between predetermined expected or acceptable behavior data, and actual behavior data received or otherwise identified from the client devices 106. If the behavior differences are identified as a security risk, the network service 107 can transmit a security event notification 171 to the UEM service 120. In some cases, the network service 107 can be considered part of the UEM service 120 such that the actions described for the network service 107 can be attributed to and performed by the UEM service 120. The UEM service 120 can identify the security risk and transmit a resume encryption command to the affected client device 106.

In one specific example, the network service 107 can identify that volume encryption is suspended for more than an expected number of client devices 106 according to the device update schedule 129 and other known volume encryption suspension activities. The network service 107 can identify this as a security risk and can generate and transmit a security event notification 171 to the UEM service 120. The UEM service 120 can identify the security risk based on the security event notification 171 and transmit a resume encryption command to the affected client device 106. For example, the UEM service 120 can place a command in the command queue maintained for the client devices 106 and can utilize a push notification service to trigger the client device 106 to check in and retrieve the resume encryption command.

In other examples, the network service 107 can identify that a virus or another risk factor is present in one or more of the client devices 106. The risk factor can be an encryption-specific or encryption-agnostic risk factor. For example, a virus or another security risk factor can be encryption-specific if it affects unencrypted volumes while encrypted volumes are not affected. The network service 107 can identify the security risk and can generate and transmit a security event notification 171 to the UEM service 120.

The network service 107 can also identify the security risk for a client device 106 and invoke a resume encryption API of the UEM service 120. The resume encryption API can be invoked using a device identifier of the client device 106 as a parameter. The resume encryption API can also take a description of the security risk and a security risk level as additional parameters. While the network service 107 can invoke the resume encryption API, other entities, such as a client device 106, or such as an administrator's client device 106 with appropriate authentication can invoke the resume encryption API specifying one or more client devices 106, a description of the security risk, and a security risk level as additional parameters.

The network service 107 can also identify suspension limit data 130 and provide it to the UEM service 120. The network service 107 can analyze data received from client devices 106 that are performing a specific type of update according to the device update schedule 129 and the data received from the client devices 106 to determine that the type of update requires a volume encryption suspension. The network service 107 can also analyze the data to determine that the specific type of update is associated with a volume encryption suspension requirement such as a specific number of reboots, or a time window of a specific amount of time. The network service 107 can provide this suspension limit data 130 to the UEM service 120. The UEM service 120 can then use this information as default or recommended suspension limits in for volume encryption suspensions.

The UEM service 120 can also maintain a suspend encryption API. A network service 107 can invoke the suspend encryption API, providing a device identifier, a suspension limit, and a description of or code associated with a reason to suspend encryption as parameters. The network service 107 can identify that a client device 106 is associated with an update, identify an appropriate suspension limit based on the update, and invoke the suspend encryption API. A client device 106 with appropriate authentication can also invoke the suspend encryption API.

In some examples, once authentication is completed by the UEM service 120 and the identity provider 118, the network service 107 and the client device 106 can communicate directly. The UEM agent 145 can invoke the API or function of the network service 107 to store, modify, and retrieve removable drive recovery keys 137 from the network service 107. In other cases, the UEM service 120 can work as a pass-through or intermediate between the client device 106 and the network service 107.

The client devices 106 are representative of one or more client devices 106. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communication devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

An example client device 106 can be enrolled by the UEM service 120 for device management. A UEM agent 145 can be installed on a client device 106 to locally manage the device on behalf of the remotely executed UEM service 120. The UEM agent 145 can be installed with elevated privileges or be effectuated through operating system APIs to manage the client device 106 on behalf of the UEM service 120. The UEM agent 145 can have the authority to manage data on the client device 106, install, remove, or disable certain applications, or install configuration profiles, such as VPN certificates, Wi-Fi profiles, email profiles, etc.

The UEM agent 145 can also have the authority to enable or disable certain hardware features of the client device 106 in certain instances. For example, the UEM agent 145 can communicate with the operating system of the client device 106 to disable access to the fixed drive 147 unless it is encrypted according to a volume encryption policy 132. The UEM agent 145 can also place the device into different hardware modes, such as airplane mode, silent mode, do-not-disturb mode, or other modes supported by the client device 106.

The UEM agent 145 can alter operation of the client device 106 in response to commands or policies provided by the UEM service 120 to the client device 106. The UEM agent 145, in one instance, can poll the UEM service 120, or a command queue associated with the UEM service 120, to determine whether a management command intended for the client device 106 has been sent to the client device 106. In response to the command queue having a command for a client device 106, the UEM agent 145 can retrieve the command and execute the command on the client device 106. The command might instruct the UEM agent 145 to install a configuration profile, enforce a restriction or policy, or take other management actions on the client device 106. In one example, the UEM service 120 might detect that the client device 106 is out of compliance with respect to a compliance rule and might instruct the UEM agent 145 to restrict a hardware feature of the client device 106, delete data from the client device 106, or disable certain applications on the client device 106. The UEM agent 145 can also take other variations of management actions on the client device 106 as directed by the UEM service 120.

As part of the enrollment process, the UEM service 120 and/or UEM agent 145 can be registered as a device administrator of the client device 106, permitting the UEM service 120 and/or UEM agent 145 to manage certain operating aspects of the client device 106. The UEM agent 145 can operate at a privileged level associated with a system account of the operating system 143. The UEM service 120 can remotely configure the client device 106 by interacting with the UEM agent 145. The UEM service 120 can also transfer various software components to the client device 106, and those software components can be installed and/or configured on the client device 106 at the direction of the UEM agent 145. Such software components can include, for example, applications, resources, libraries, drivers, device configurations, or other related components. The UEM service 120 can also transfer various management policies, compliance rules, and configuration data for enforcement on the client device 106, and those policies, rules, and data can be stored on the client device 106 by the UEM agent 145 The UEM service 120 can then instruct the UEM agent 145 and the operating system of the client device 106 to enforce the management policies, compliance rules, and configuration data stored on the client device 106.

The network 111 can include the Internet, intranets, extranets, wide area networks (WANs), local area networks (LANs), wired networks, wireless networks, cable networks, satellite networks, other suitable networks, or any combinations thereof. As one example, the cloud computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

In the networked environment 100, the cloud computing environment 103, the network service 107, and the client devices 106 can communicate data among each other over the network 111 using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

Figure 2:
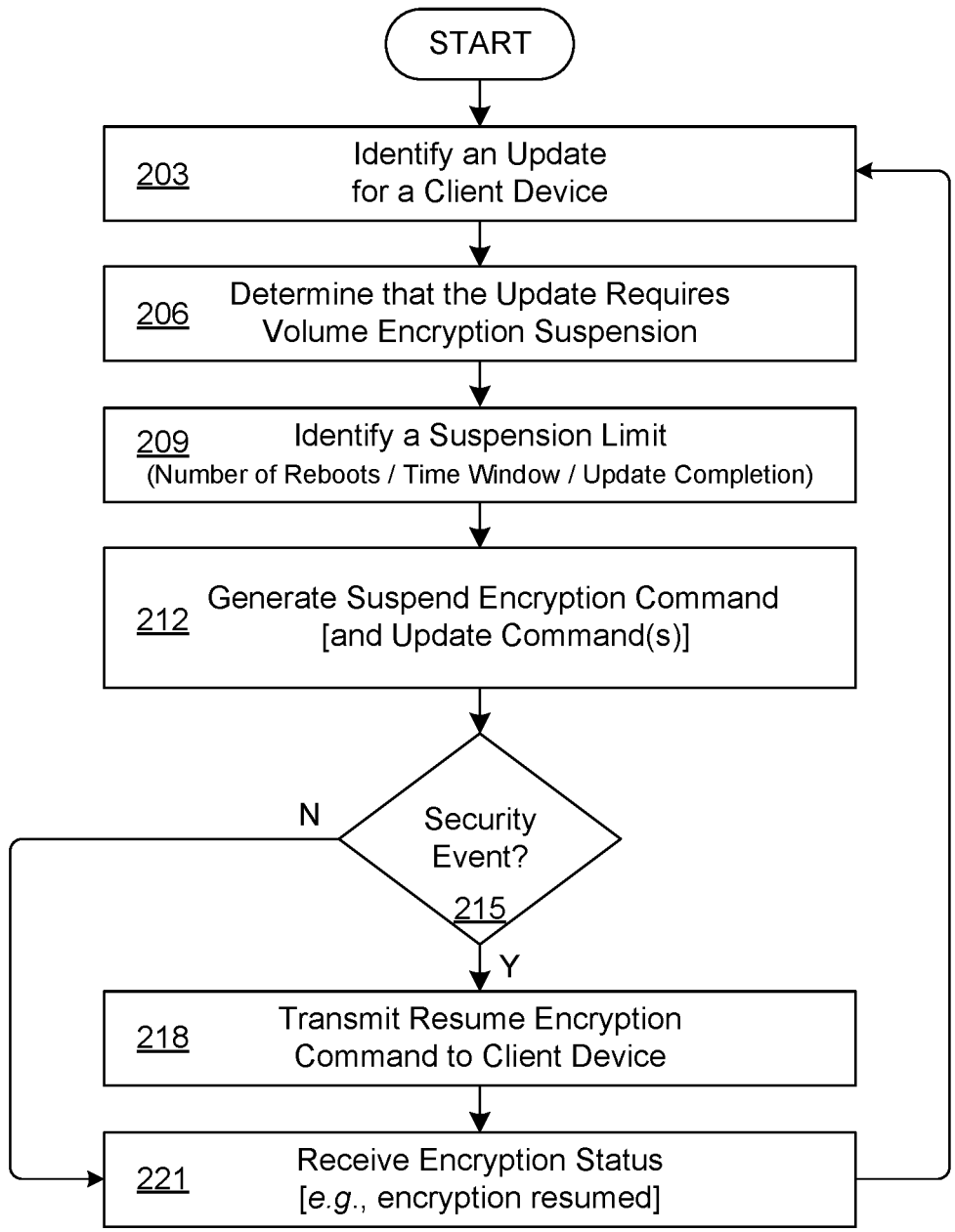
FIG. 2 illustrates a flowchart performed by components of the networked environment for secure volume encryption suspension for managed client device updates, according to various examples described herein.

FIG. 2 shows a flowchart performed by components of the networked environment 100. The flowchart illustrates how a UEM service 120 can interact with other components of the networked environment 100 to provide secure volume encryption suspension for managed client devices 106. Generally, the flowchart shows how the UEM service 120 can provide user interface elements and interact with components of the networked environment 100 to generate a suspend encryption command and monitor for security events to resume encryption, if appropriate.

In step 203, the UEM service 120 can identify an update for a client device 106. The UEM service 120 can identify the update from a record stored in the data store 110. The UEM service 120 can receive the update from a network service 107. The UEM service 120 can also generate a console user interface through which an administrator can specify the update for the client device 106. The update can include a manual update such as a hardware update that is to be performed manually or a software or firmware update that is to be performed manually. The update can also include an automated update that is performed by the UEM agent 145 executed on the client device 106. Automated updates can include software and firmware updates. Software updates can include application updates and operating system updates.

In step 206, the UEM service 120 can determine that the update requires volume encryption suspension. For example, the UEM service 120 can identify an update type specified for the update. For example, the UEM service 120 can identify a hardware update type along with a specification of the hardware to be added, removed, or swapped. The UEM service 120 can identify a software update, as well as a specification of the operating system 143 and version, or application and version to be installed or uninstalled as part of the update. The UEM service 120 can identify a firmware update, as well as a specification of the firmware type and version, such as whether the firmware update is a BIOS update, a peripheral device firmware update, and so on. The UEM service 120 can determine that the update requires volume encryption suspension based on update type information and suspension requirement data or other data stored in the data store 110.

In step 209, the UEM service 120 can identify an encryption suspension limit for the volume encryption suspension. The UEM service 120 can identify a suspension limit by querying the suspension limit data 130 or transmitting a query a network service 107 using the update type information. In some cases, the UEM service 120 identify a suspension limit for the volume encryption suspension concurrently with identifying that the update requires volume encryption suspension. The UEM service 120 can determine that the update requires volume encryption suspension based on update type information and suspension requirement data, suspension limit data 130, and other data stored in the data store 110. The UEM service 120 can also transmit a query to the network service 107 that specifies the update type, and the network service 107 can return suspension limit data 130 as an indication that volume encryption suspension is required. In other cases, the network service 107 can provide the suspension limit data 130 once identified and based on data received regarding updates of that type from the client devices 106.

In step 212, the UEM service 120 can generate and transmit a suspend encryption command to the client device 106. The suspend encryption command can include the encryption suspension limit that is identified. The encryption suspension limit can include one or more of a number of reboots and a time period as a limit. In some cases, the operating system 143 or other volume encryption service can take a number of reboots as a parameter in order to suspend encryption for the number of reboots, where a particular parameter such as zero suspends encryption indefinitely. If the suspension limit includes a number of reboots, the UEM service 120 can generate a suspend encryption command that includes the number of reboots. If the suspension limit includes a time window, the UEM service 120 can generate a suspend encryption command that specifies the time window as well. If only a time window is specified, then an suspend encryption command can include the indefinite suspension parameter, or an arbitrary large number of reboots, and a command for the UEM agent 145 to restore encryption after the time window has elapsed.

The UEM service 120 can also generate and transmit update commands for the UEM agent 145 to perform the update. If the update is an automated update of firmware, applications, or the operating system 143, the UEM agent can perform these updates in an automated fashion. The UEM service 120 can generate commands to perform the updates and transmit them to the client device 106. The suspend encryption command and update commands can be placed in a command queue for the client device 106, and the UEM agent 145 can check in to retrieve the commands. The UEM agent 145 can then implement the suspend encryption command and any update commands.

In step 215, the UEM service 120 can determine whether a security event has occurred. The UEM service 120 or the network service 107 can analyze operational parameters from the client devices 106 to identify security events that can affect client devices 106 that have volume encryption suspended. Where the network service 107 is utilized, the UEM service 120 can receive a security event notification 171 indicating that a security event affects one or more client device 106. If a security event affects a client device 106 that has volume encryption suspended, the process can move to step 218, otherwise the process can proceed to step 221.

In step 218, the UEM service 120 can transmit a resume encryption command to the client device 106. In order to minimize security risks and exposure, the UEM service 120 can transmit the resume encryption command to the client device 106. In some cases, the UEM service 120 can place the resume encryption command and can utilize a push notification service to cause the UEM agent 145 or other instructions executed on the client device 106 to check in immediately.

In step 221, the UEM service 120 can receive an encryption status report from the UEM agent 145. The encryption status reports can be received from the UEM agent 145 through the suspension process. For example, the UEM agent 145 can report that encryption is suspended, and the remaining number of reboots and time for the volume encryption suspension. The UEM agent 145 can provide updated encryption status reports periodically and in response to events such as reboot events. The UEM service 120 can generate a console user interface that provides this information to administrative users for individual client device 106 as well as on an aggregated scale.

The UEM service 120 can also receive device update status reports from the UEM agent 145. For example, the UEM agent 145 can report that the update, or a portion of the update has been initiated, completed, or will initiate at a certain time or in response to an event specified in the device update status report. If the UEM service 120 receives an device update status report indicating that the update is completed, the UEM service 120 can immediately provide a resume encryption command to increase security. In other cases, the suspend encryption command can include instructions for the UEM agent 145 to immediately resume encryption upon update completion. The client device 106 that is being updated, or an information technology professional's client device 106 can transmit an indication that a manual update of the client device 106 is completed. This can be provided to the client device 106 being updated or to the UEM service 120.

Figure 3:
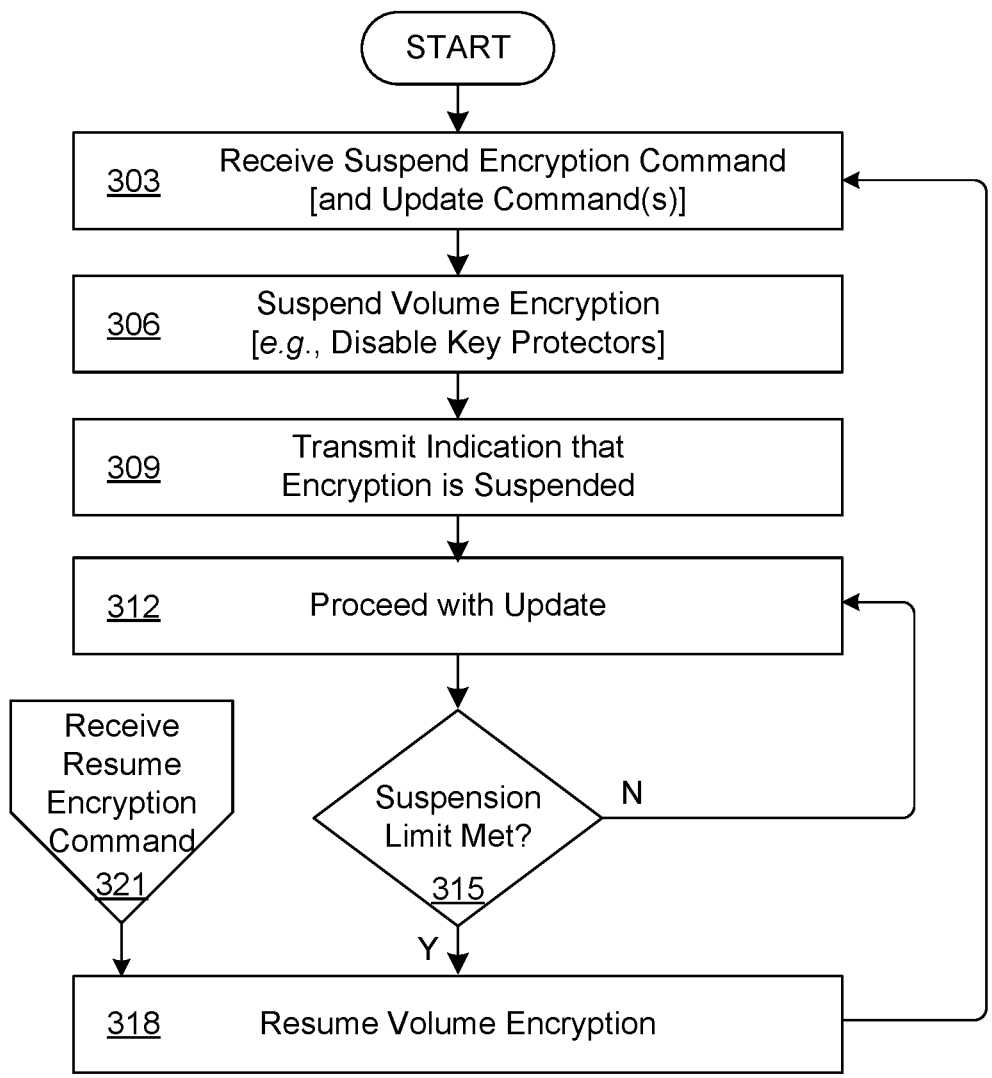
FIG. 3 illustrates another flowchart performed by components of the networked environment for secure volume encryption suspension for managed client device updates, according to various examples described herein.

FIG. 3 shows a flowchart performed by components of the networked environment 100. The flowchart illustrates how a UEM agent 145 can interact with other components of the networked environment 100 to provide secure volume encryption suspension for managed client devices 106. Generally, the flowchart shows how the UEM agent 145 can receive and implement a suspend encryption command from the UEM service 120, update the client device 106 according to update commands, and resume volume encryption once the suspension limit is met.

In step 303, the UEM agent 145 can receive a suspend encryption command. The UEM agent 145 can also receive an update command, for example, if the suspend encryption command is associated with an update that is to be performed by the UEM agent 145. The suspend encryption command can include an indication of one or more suspension limits. The suspension limit can include a number of reboots, a time window or time period, as well as an indication to resume encryption if the update is completed. The suspension limit can also indicate to resume encryption if the update has failed. The suspension limit can indicate information that describes parameters that the UEM agent 145 can detect to determine whether the update has completed or failed. The suspend encryption command can include a future time to initiate volume encryption suspension on the client device 106. However, in some cases the initiation time is tracked by the UEM service 120 and the suspend encryption command is transmitted or placed in a command queue for the client device 106 at the initiation time.

In step 306, the UEM agent 145 can suspend volume encryption for the client device 106. The client device 106 can have one or more drives or volumes that are encrypted using a volume encryption service. The encryption service can be integrated with the operating system 143 or can be separate. The UEM agent 145 can provide a command or instructions to suspend volume encryption to the operating system 143 or other volume encryption service. The UEM agent 145 can provide the instructions along with a parameter that indicates how long encryption should be suspended. The parameter can include a number or character associated with a number of reboots, a duration of time, a specific time window that includes a start time and an end time, or another parameter.

In step 309, the UEM agent 145 can transmit an indication that encryption is suspended. The UEM agent 145 can provide encryption status reports periodically and at the completion of certain events such as upon success/failure of volume encryption suspension, upon reboot, and upon success/failure of resuming volume encryption. The UEM agent 145 can also provide update status reports periodically and at the completion of certain events such as upon starting the update, upon reboot, and upon success/failure of the update or a portion of the update.

In step 312, the UEM agent 145 can proceed with the update. For manual hardware updates, the UEM agent 145 may be offline, but once rebooted, the UEM agent 145 can detect that hardware installed to the client device 106, compare the currently installed hardware to hardware associated with the update, and determine whether the update has completed. The UEM agent 145 can perform certain updates be executing update commands. The UEM agent 145 can perform updates to the encryption algorithm used for volume encryption, updates to the operating system 143, updates to applications and other software, updates to BIOS and other firmware, and others.

In step 315, the UEM agent 145 can determine whether a suspension limit is met. The UEM agent 145 can detect system parameters and operational values such as a system time associated with the client device 106, or track an elapsed time, or detect that a reboot has occurred in order to determine whether one or more suspension limit is met. If a suspension limit is met, then the process can proceed to step 318. Otherwise, the process can proceed to step 312.

In step 318, the UEM agent 145 can resume volume encryption on the client device 106. The UEM agent 145 can provide instructions for the operating system 143 or other volume encryption service to resume volume encryption. The volume encryption service can also track the suspension limit or a portion of the suspension limit. If a suspension limit that is tracked by the volume encryption service is met, the UEM agent 145 can check whether the encryption is resumed. If so, then the UEM agent 145 does not need to provide instructions to resume volume encryption. However, the UEM agent 145 can provide instructions to resume volume encryption if the volume encryption service does not resume volume encryption as expected.

There can also be more than one suspension limit, such as a number of reboots as well as a timeout or time window. In some examples, the volume encryption service can track one of the suspension limits but not others. For example, the volume encryption service cannot generally track a suspension limit that indicates volume encryption is to resume once an update has completed. In this case, the UEM agent 145 can determine that the suspension limit untracked by the volume encryption service is met and can provide instructions to resume volume encryption. Thereafter, the UEM agent 145 can provide an encryption status report indicating that volume encryption has resumed.

In step 321, the UEM agent 145 can receive a resume encryption command from the UEM service 120. The UEM service 120 can transmit a resume encryption command in certain situations. For example, the UEM service 120 can identify a security event, or an administrator can select a user interface element in a management console of the UEM service 120. In either case, the UEM agent 145 can proceed to step 318 and instruct the volume encryption service to resume encryption, even if the suspension limit is not met.

FIG. 4 shows an example management console of the UEM service 120. The management console can include a user interface area 403 that enables an administrative user to suspend volume encryption for one or more client devices 106. The UEM service 120 can consider suspending volume encryption to be a restricted action associated with a security risk. The user interface area 403 can include a warning that the suspend volume encryption action is restricted, and that a note description of the reason for the suspend volume encryption action is required in order to proceed. In some cases, the UEM service 120 can also log the username or account of a user that initiates or submits a suspend volume encryption action. The user interface area 430 can also include a warning that the username or account will be logged.

The user interface area 403 can include a user interface element 406 through which a user can enter or modify a number of reboots as a suspension limit. In some examples, an initial number of reboots can be entered automatically by the UEM service 120. The UEM service 120 can identify the initial number of reboots based on an expected number of reboots required for the update type associated with the suspend volume action.

The user interface area 403 can include a user interface element 409 through which a user can enter or modify a scheduled time to suspend volume encryption, as well as a time or date based suspension limit such as a time window or a duration to suspend volume encryption. The user interface area 403 can also specify information about the client device 106, including its platform, a username or account of a user of the client device 106, an operating system version, an email address of a user of the client device 106, a display model of the client device 106, an organizational group associated with the client device 106 or the user, and an update type for an update to the client device 106.

The user interface area 403 can include a user interface element 412 through which a user can select a predetermined description of the reason to suspend volume encryption or enter a customized reason to suspend volume encryption. The user interface area 403 can also include a user interface element 415 that submits or applies the suspend volume encryption action as specified through the user interface area 403. Once selected, the UEM service 120 can generate a suspend volume encryption command and transmit it to the client device 106.

Figure 5:
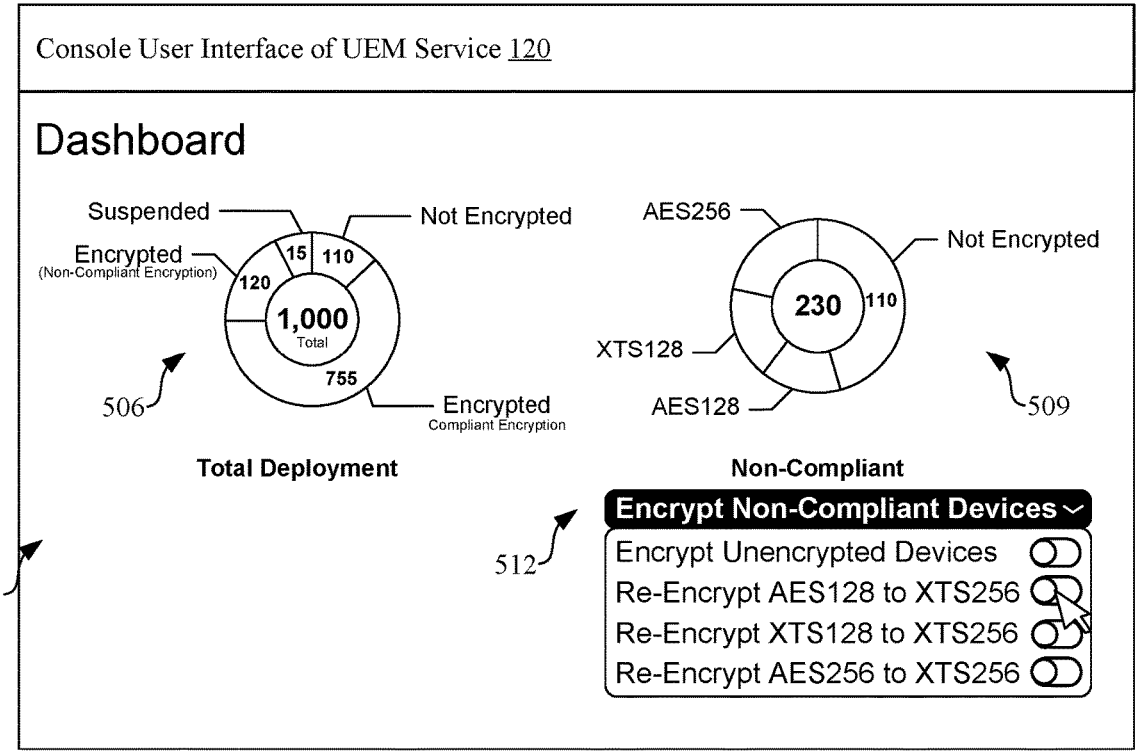
FIG. 5 illustrates another example user interface for secure volume encryption suspension for managed client device updates, according to various examples described herein.

FIG. 5 shows another example of the management console of the UEM service 120. The management console can include a dashboard user interface area 503 that provides aggregated information about volume encryption and suspension for a total deployment of client devices 106.

The dashboard user interface area 503 can include a user interface element 506. The user interface element 506 can provide a graph such as a pie chart, bar chart, line chart, or another graphical representation that shows a total number of client devices 106, as well as a graphical representation and number of client devices 106 that are: encrypted with a compliant encryption type, encrypted with a non-compliant encryption type, not encrypted, and suspended. The UEM service 120 can determine compliant and non-compliant encryption types based on a comparison with a compliant encryption type specified by the volume encryption policies 132 for the client devices 106.

The dashboard user interface area 503 can include a user interface element 509 that provides an aggregated view of non-compliant client devices 106 according to the reason for non-compliance with the volume encryption policies 132 for the client devices 106. For example, a volume encryption policy 132 can specify XTS256 or XTS-AES256 encryption. The UEM service 120 can determine that unencrypted client devices 106 and those encrypted using other encryption types are non-compliant. The user interface element 509 can show a graphical representation and a number of client devices 106 that are: unencrypted, AES128 encrypted, AES256 encrypted, and XTS128 encrypted.

The dashboard user interface area 503 can include a user interface element 512 that enables an administrator to encrypt or re-encrypt a selected subset of client devices 106 that are non-compliant with volume encryption policies 132. The user interface element 512 or dashboard user interface area 503 can also include selectors for specified subsets of the client devices 106 that are shown in the user interface element 509. Re-encryption of currently encrypted client devices 106 can require volume encryption suspension. Selecting the user interface element 512 can initiate the process such as discussed with respect to FIG. 2. Re-encryption of client devices 106 can correspond to an update that requires volume encryption suspension for those client devices 106 that are currently encrypted with a non-compliant encryption type.

Figure 6:
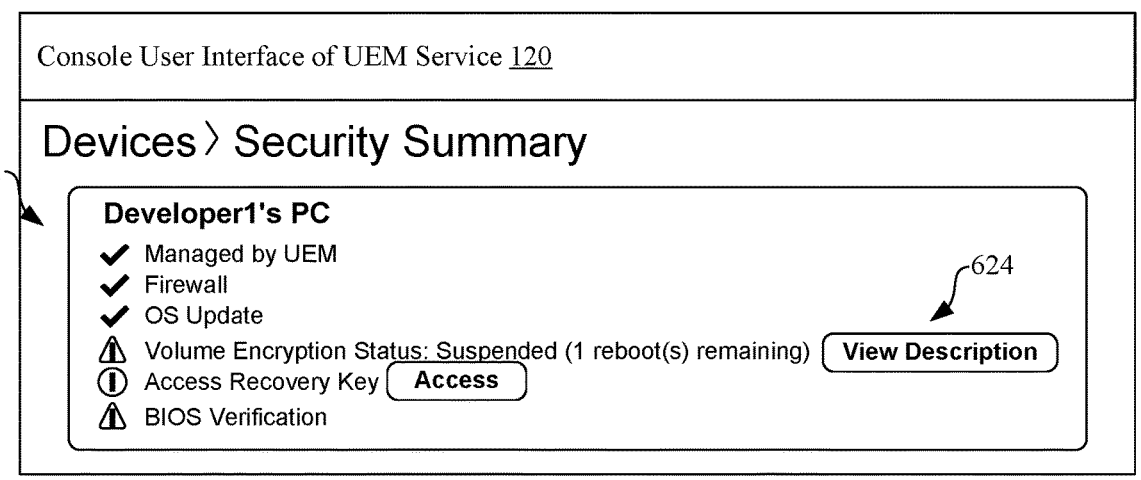
FIG. 6 illustrates another example user interface for secure volume encryption suspension for managed client device updates, according to various examples described herein.

FIG. 6 shows another example of the management console of the UEM service 120. The management console can include a user interface area 621 that provides compliance information about a particular client device 106. The user interface area 621 can include compliance information regarding compliance with compliance policies 131 including volume encryption policies 132. The user interface area 621 can provide a graphical indication such as an approval icon or a symbol indicating that the client device 106 for "Developer1" is managed by the UEM service 120. The approval icon or symbol can also be used to indicate that the client device 106 is associated with use of a specified firewall, has an updated operating system 143 and operating system updates enabled, and complies with other compliance policies 131. The user interface area 621 can provide a graphical indication such as a warning icon or symbol indicating that volume encryption of the client device 106 is suspended. Even if the suspension is initiated by the UEM service 120, this can correspond to a security risk according to the volume encryption policies 132 or other compliance rules.

The user interface area 621 can also indicate a remaining portion of time or reboots based on a suspension limit and an encryption status update received from the client device 106. The user interface area 621 can also include a user interface element 624. Once the user interface element 624 is selected, the management console can be updated to show a user interface area or user interface element that includes the description of the reason for the volume encryption suspension. Additional information and user interface elements can also be shown.

The flowchart(s) and sequence diagram(s) show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The cloud computing environment 103 can include at least one processing circuit. Such a processing circuit can include, for example, one or more processors and one or more storage or memory devices that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the UEM service 120 and/or other components can be stored in one or more storage devices and be executable by one or more processors in the networked environment 100. Similarly, the agents, services, applications and/or other components described herein can be stored in one or more storage devices and be executable by one or more processors in the client device 106.

The UEM service 120 and/or other components described herein can be embodied in the form of hardware, software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the UEM service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method, comprising:
    determining, by a unified endpoint management (UEM) service executed in a cloud computing environment, that volume encryption is to be suspended for a client device;
    identifying, by the UEM service, a suspension limit for a volume encryption suspension for the client device, the suspension limit comprising an encryption suspension time limit for the volume encryption suspension, wherein the encryption suspension time limit is identified to correspond to a time window accessed from update schedule data for an update to the client device;
    generating, by the UEM service, a suspend encryption command comprising: the encryption suspension time limit, and instructions for the client device to apply the volume encryption suspension to the client device according to the encryption suspension time limit, the instructions further causing the client device to identify whether the update is completed and to resume encryption in an instance in which the update is identified as completed and the encryption suspension time limit has not elapsed; and
    transmitting, by the UEM service, the suspend encryption command to the client device to apply the volume encryption suspension to the client device.

2. The method according to claim 1, further comprising:
    identifying, by the UEM service, an update schedule comprising the update for the client device; and
    identifying, by the UEM service, that the update requires the volume encryption suspension, wherein the UEM service determines that the volume encryption is to be suspended based on the update requiring the volume encryption suspension.

3. The method according to claim 1, further comprising:
    generating, by the UEM service, a console user interface comprising an encryption suspension user interface element that schedules the volume encryption suspension for the client device, wherein the UEM service determines that the volume encryption is to be suspended based on the volume encryption suspension being scheduled.

4. The method according to claim 3, wherein the console user interface comprises a suspension limit user interface element that enables a user to enter or update the suspension limit.

5. The method according to claim 4, wherein the suspension limit user interface element comprises an initial suspension limit that indicates an expected suspension requirement in order to perform the update for the client device.

6. The method according to claim 1, further comprising:
    identifying, by the UEM service, a security event associated with at least one of: the client device, and a group of client devices comprising the client device; and transmitting, by the UEM service, a resume encryption command comprising instructions for the client device to resume the volume encryption.

7. The method according to claim 6, wherein the security event is identified based on a security event notification received by the UEM service from an intelligence service that analyzes data associated with a plurality of client devices managed by the UEM service.

8. A non-transitory computer-readable medium embodying instructions executable by at least one computing device, the instructions, when executed, causing the at least one computing device to at least:
   determine, by a unified endpoint management (UEM) service executed in a cloud computing environment, that volume encryption is to be suspended for a client device;
   identify, by the UEM service, a suspension limit for a volume encryption suspension for the client device, the suspension limit comprising an encryption suspension time limit for the volume encryption suspension, wherein the encryption suspension time limit is identified to correspond to an update to the client device;
   generate, by the UEM service, a suspend encryption command comprising: the encryption suspension time limit, and instructions for the client device to apply the volume encryption suspension to the client device according to the encryption suspension time limit, the instructions further causing the client device to identify whether the update is completed and to resume encryption in an instance in which the update is identified as completed and the encryption suspension time limit has not elapsed; and
   transmit, by the UEM service, the suspend encryption command to the client device to apply the volume encryption suspension to the client device.

9. The non-transitory computer-readable medium according to claim 8, wherein the instructions further cause the at least one computing device to at least:
   identify, by the UEM service, an update schedule comprising the update for the client device; and
   identify, by the UEM service, that the update requires the volume encryption suspension, wherein the UEM service determines that the volume encryption is to be suspended based on the update requiring the volume encryption suspension.

10. The non-transitory computer-readable medium according to claim 8, wherein the instructions further cause the at least one computing device to at least:
   generate, by the UEM service, a console user interface comprising an encryption suspension user interface element that schedules the volume encryption suspension for the client device, wherein the UEM service determines that the volume encryption is to be suspended based on the volume encryption suspension being scheduled.

11. The non-transitory computer-readable medium according to claim 10, wherein the console user interface comprises a suspension limit user interface element that enables a user to enter or update the suspension limit.

12. The non-transitory computer-readable medium according to claim 11, wherein the suspension limit user interface element comprises an initial suspension limit that indicates an expected suspension requirement in order to perform the update for the client device.

13. The non-transitory computer-readable medium according to claim 8, wherein the instructions further cause the at least one computing device to at least:
   identify, by the UEM service, a security event associated with at least one of: the client device, and a group of client devices comprising the client device; and
   transmit, by the UEM service, a resume encryption command comprising instructions for the client device to resume the volume encryption.

14. The non-transitory computer-readable medium according to claim 13, wherein the security event is identified based on a security event notification received by the UEM service from an intelligence service that analyzes data associated with a plurality of client devices managed by the UEM service.

15. A system, comprising:
   at least one computing device; and
   instructions accessible by the at least one computing device, wherein the instructions, when executed, cause the at least one computing device to at least:
      determine, by a unified endpoint management (UEM) service executed in a cloud computing environment, that volume encryption is to be suspended for a client device;
      identify, by the UEM service, a suspension limit for a volume encryption suspension for the client device, the suspension limit comprising an encryption suspension time limit for the volume encryption suspension, wherein the encryption suspension time limit is identified to correspond to an update to the client device;
      generate, by the UEM service, a suspend encryption command comprising: the encryption suspension time limit, and instructions for the client device to apply the volume encryption suspension to the client device according to the encryption suspension time limit, the instructions further causing the client device to identify whether the update is completed and to perform at least one action in an instance in which the update is identified as completed regardless of whether the encryption suspension time limit has elapsed; and
      transmit, by the UEM service, the suspend encryption command to the client device to apply the volume encryption suspension to the client device.

16. The system according to claim 15, wherein the instructions further cause the at least one computing device to at least:
   identify, by the UEM service, an update schedule comprising the update for the client device; and
   identify, by the UEM service, that the update requires the volume encryption suspension, wherein the UEM service determines that the volume encryption is to be suspended based on the update requiring the volume encryption suspension.

17. The system according to claim 15, wherein the instructions further cause the at least one computing device to at least:
   generate, by the UEM service, a console user interface comprising an encryption suspension user interface element that schedules the volume encryption suspension for the client device, wherein the UEM service determines that the volume encryption is to be suspended based on the volume encryption suspension being scheduled.

18. The system according to claim 17, wherein the console user interface comprises a suspension limit user interface element that enables a user to enter or update the suspension limit.

19. The system according to claim 18, wherein the suspension limit user interface element comprises an initial suspension limit that indicates an expected suspension requirement in order to perform the update for the client device.

20. The system according to claim 15, wherein the instructions further cause the at least one computing device to at least:
- identify, by the UEM service, a security event associated with at least one of: the client device, and a group of client devices comprising the client device; and
- transmit, by the UEM service, a resume encryption command comprising instructions for the client device to resume the volume encryption.

* * * * *